US010570037B2

(12) United States Patent
Berg et al.

(10) Patent No.: US 10,570,037 B2
(45) Date of Patent: *Feb. 25, 2020

(54) SYSTEMS AND METHODS FOR REMOVING FINELY DISPERSED PARTICULATE MATTER FROM A FLUID STREAM

(71) Applicant: Soane Mining, LLC, Cambridge, MA (US)

(72) Inventors: Michael C. Berg, Somerville, MA (US); John H. Dise, Kirkland, WA (US); Kevin T. Petersen, Cheshire, CT (US); David S. Soane, Palm Beach, FL (US); Kristoffer K. Stokes, Jamaica Plain, MA (US); William Ware, Jr., Hanover, NH (US); Atul C. Thakrar, Minneapolis, MN (US)

(73) Assignee: Soane Mining, LLC, Palm Beach Gardens, FL (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/419,153

(22) Filed: Jan. 30, 2017

(65) Prior Publication Data
US 2017/0203982 A1 Jul. 20, 2017

Related U.S. Application Data

(63) Continuation of application No. 13/675,661, filed on Nov. 13, 2012, now Pat. No. 9,758,396, which is a continuation of application No. 12/363,369, filed on Jan. 30, 2009, now Pat. No. 8,353,641.

(60) Provisional application No. 61/028,717, filed on Feb. 14, 2008, provisional application No. 61/117,757, filed on Nov. 25, 2008, provisional application No. 61/140,525, filed on Dec. 23, 2008.

(51) Int. Cl.
C02F 1/40 (2006.01)
C02F 1/38 (2006.01)
C02F 1/52 (2006.01)
C02F 1/56 (2006.01)
B01D 21/01 (2006.01)
C02F 1/54 (2006.01)
C02F 9/00 (2006.01)
B03D 1/01 (2006.01)
C02F 1/00 (2006.01)
C02F 103/10 (2006.01)

(52) U.S. Cl.
CPC .............. C02F 1/54 (2013.01); B03D 1/01 (2013.01); C02F 1/001 (2013.01); C02F 1/385 (2013.01); C02F 1/5236 (2013.01); C02F 1/5263 (2013.01); C02F 1/56 (2013.01); C02F 9/00 (2013.01); C02F 1/40 (2013.01); C02F 2001/007 (2013.01); C02F 2103/10 (2013.01); C02F 2305/12 (2013.01)

(58) Field of Classification Search
CPC ........ C02F 1/683; C02F 1/5281; C02F 1/004; C02F 1/40; C02F 1/56; C02F 2103/10; C02F 2001/007; C02F 2305/12; C02F 1/385; C02F 1/001; C02F 1/52; C02F 1/5209; C02F 1/5272; C02F 1/54; C02F 9/00; C02F 1/5263; C02F 1/5236; B01D 21/01; B01D 21/0012; B01D 21/26; B03D 1/004; B03D 1/01; B03D 1/016; B03D 2201/002; B03D 2201/02
See application file for complete search history.

(56) References Cited

U.S. PATENT DOCUMENTS

| 3,198,839 | A | | 8/1965 | Lalet et al. |
| 3,723,310 | A | | 3/1973 | Hentz et al. |
| 3,868,318 | A | | 2/1975 | Clark et al. |
| 3,996,696 | A | | 12/1976 | Davidtz et al. |
| 4,346,010 | A | | 8/1982 | Ogino et al. |
| 4,906,386 | A | | 3/1990 | Vasconcellos et al. |
| 4,913,585 | A | | 4/1990 | Thompson et al. |
| 5,071,587 | A | | 12/1991 | Perman |
| 5,073,272 | A | | 12/1991 | O'Neill et al. |
| 5,178,774 | A | * | 1/1993 | Payne .................. C02F 1/5227 209/5 |
| 5,443,158 | A | * | 8/1995 | McKenny ................. B03B 1/04 209/166 |
| 5,449,464 | A | | 9/1995 | El-Shall et al. |

(Continued)

FOREIGN PATENT DOCUMENTS

| CA | 2363932 A1 | 5/2003 |
| CN | 101087733 A | 12/2007 |

(Continued)

OTHER PUBLICATIONS

Yuan, X. S., and Shaw, W., "Novel Processes for Treatment of Syncrude Fine Transition and Marine Ore Tailings," Canadian Metallurgical Quarterly, 46(3): 265-272 (2007).
"Praestol® Anionic and Nonionic Polymers Municipal and Industrial Wastewater Treatment", Demols, Inc. pp. 1-3, accessed online Jan. 26, 2017.
Zhang, et al., "Development of an Ultra-fine Coal Dewatering Technology and an Integrated Flotation-Dewatering System for Coal Preparation Plants", DOE Grant Final Report. Mar. 1, 2007.
Pillai, J., "Flocculants and Coagulants: The Keys to Water and Waste Management in Aggregate Production", Nalco, 1997.
Article "Ballasted Flocculation", Water Online, published on Nov. 25, 1998.

(Continued)

Primary Examiner — Joseph W Drodge
(74) Attorney, Agent, or Firm — Elmore Patent Law Group, P.C.; Mahreen Chaudhry Hoda; Carolyn S. Elmore

(57) ABSTRACT

Disclosed herein are systems for removing particulate matter from a fluid, comprising a particle functionalized by attachment of at least one activating group or amine functional group, wherein the modified particle complexes with the particulate matter within the fluid to form a removable complex therein. The particulate matter has preferably been contacted, complexed or reacted with a tethering agent. The system is particularly advantageous to removing particulate matter from a tailing solution.

15 Claims, No Drawings

(56) References Cited

U.S. PATENT DOCUMENTS

| | | |
|---|---|---|
| 5,543,056 A | 8/1996 | Murcott et al. |
| 5,624,570 A | 4/1997 | Hassick et al. |
| 5,670,435 A | 9/1997 | Kajita et al. |
| 5,693,222 A | 12/1997 | Galvan et al. |
| 5,703,272 A | 12/1997 | Abe et al. |
| 5,772,776 A * | 6/1998 | Holbein ............ B03D 1/012 134/10 |
| 5,804,077 A | 9/1998 | Smith et al. |
| 5,843,315 A | 12/1998 | Baughn et al. |
| 5,863,982 A | 1/1999 | Huang et al. |
| 6,042,732 A | 3/2000 | Jankowski et al. |
| 6,077,439 A * | 6/2000 | El-Ammouri ........ C02F 1/281 210/665 |
| 6,126,837 A | 10/2000 | Miknevich et al. |
| 6,184,302 B1 | 2/2001 | Eyrisch et al. |
| 6,214,237 B1 | 4/2001 | Kustra et al. |
| 6,403,726 B1 | 6/2002 | Ward et al. |
| 6,426,383 B1 | 7/2002 | Fong et al. |
| 6,544,525 B1 | 4/2003 | Yegorova et al. |
| 6,827,874 B2 | 12/2004 | Souter et al. |
| 6,884,842 B2 | 4/2005 | Soane et al. |
| 6,926,465 B1 | 8/2005 | Mann et al. |
| 7,045,673 B1 | 5/2006 | Lerner et al. |
| 7,153,436 B2 | 12/2006 | Bair et al. |
| 7,695,623 B2 | 4/2010 | Woodard et al. |
| 7,875,189 B2 | 1/2011 | Jaeger et al. |
| 8,011,514 B2 | 9/2011 | Wright et al. |
| 8,127,930 B2 | 3/2012 | Wright et al. |
| 8,147,682 B2 | 4/2012 | Lahaie et al. |
| 8,187,470 B2 | 5/2012 | Wang et al. |
| 8,349,188 B2 * | 1/2013 | Soane ................ C02F 1/40 210/666 |
| 8,353,641 B2 * | 1/2013 | Berg ............... C02F 1/001 404/72 |
| 8,557,123 B2 * | 10/2013 | Berg ................ C02F 1/56 210/709 |
| 8,821,733 B2 * | 9/2014 | Soane ................ C10L 5/00 210/702 |
| 8,894,863 B2 * | 11/2014 | Soane ................ C02F 1/56 210/666 |
| 8,945,394 B2 | 2/2015 | Kincaid et al. |
| 9,458,040 B2 * | 10/2016 | Berg ................ C02F 1/56 |
| 9,493,367 B2 * | 11/2016 | Soane ............... C02F 1/40 |
| 9,758,396 B2 * | 9/2017 | Berg ............... C02F 1/001 |
| 9,919,938 B2 * | 3/2018 | Soane ................ C02F 1/56 |
| 2002/0198317 A1 * | 12/2002 | Fong .................. C02F 1/56 524/872 |
| 2004/0040912 A1 | 3/2004 | McConchie et al. |
| 2004/0159613 A1 | 8/2004 | Bair et al. |
| 2005/0061750 A1 * | 3/2005 | Fabri ................. C02F 1/56 210/728 |
| 2005/0258103 A1 | 11/2005 | Cort et al. |
| 2006/0006116 A1 | 1/2006 | Scheimann et al. |
| 2006/0151360 A1 | 7/2006 | Wright et al. |
| 2006/0180551 A1 * | 8/2006 | Beckman, III ......... C02F 1/56 210/733 |
| 2006/0196834 A1 * | 9/2006 | Nichols ............. B01D 21/01 210/702 |
| 2007/0085055 A1 | 4/2007 | Sikes et al. |
| 2007/0199903 A1 * | 8/2007 | Denney ........... B01D 21/0024 210/723 |
| 2008/0029460 A1 * | 2/2008 | Wright ............... B03D 1/01 210/705 |
| 2008/0099380 A1 | 5/2008 | Lahai et al. |
| 2010/0022008 A1 | 1/2010 | Corcoran et al. |
| 2012/0029120 A1 | 2/2012 | Soane et al. |
| 2014/0377166 A1 | 12/2014 | Esquivel et al. |
| 2019/0047890 A1 * | 2/2019 | Poffet ................ C09C 1/021 |

FOREIGN PATENT DOCUMENTS

| | | |
|---|---|---|
| EP | 0 069 435 A1 | 1/1983 |
| WO | 88/00927 | 2/1988 |
| WO | 2000/071471 A1 | 11/2000 |
| WO | 2006/047225 A2 | 5/2006 |

OTHER PUBLICATIONS

Sauvignet, P., "Sand-Ballasted Flocculation Technology", Article (Abstract Only), www.qmj.co.uk, Nov. 2003.
Ghosh, M. M., et al., "Physiochemical Approach to Water and Wastewater Filtration," Journal of the Environmental Engineering Division, 1975, vol. 101, Issue 1, p. 71-86.
Product leaflet "Coagulation Flocculation", SNF Floerger, 2003.
Anderson, S. L., Thesis "Flocculation of Clay Suspensions using Synthetic Polymers", Aug. 1986.
U.S. Appl. No. 61/117,757, Priority application of EP 2 252 404 B1.
U.S. Appl. No. 61/140,525, Priority application of EP 2 252 404 B1.
U.S. Appl. No. 12/363,369, Priority application of EP 2 252 404 B1.
U.S. Appl. No. 61/028,717, Priority application of EP 2 252 404 B1.

* cited by examiner

//us 10,570,037 B2//

SYSTEMS AND METHODS FOR REMOVING FINELY DISPERSED PARTICULATE MATTER FROM A FLUID STREAM

RELATED APPLICATIONS

This application is a continuation of U.S. application Ser. No. 13/675,661, filed Nov. 13, 2012, which is a continuation of U.S. application Ser. No. 12/363,369, filed Jan. 30, 2009 (now U.S. Pat. No. 8,353,641), which claims the benefit of U.S. Provisional Application Nos. 61/028,717, filed on Feb. 14, 2008; 61/117,757, filed on Nov. 25, 2008; 61/140,525 filed on Dec. 23, 2008. The entire teachings of the above applications are incorporated herein by reference.

PARTIES TO A JOINT RESEARCH AGREEMENT

Soane Mining, LLC and Soane Energy, LLC are parties to a "joint research agreement" as defined in 35 USC 103(c)(3).

FIELD OF THE APPLICATION

The application relates generally to particles useful for removing finely dispersed particulate matter from fluid streams.

BACKGROUND

Fine materials generated from mining activities are often found well-dispersed in aqueous environments, such as wastewater. The finely dispersed materials may include such solids as various types of clay materials, recoverable materials, fine sand and silt. Separating these materials from the aqueous environment can be difficult, as they tend to retain significant amounts of water, even when separated out, unless special energy-intensive dewatering processes or long-term settling practices are employed.

An example of a high volume water consumption process is the processing of naturally occurring ores, such as coal and oil sands. Naturally occurring ores are heterogeneous mixtures of hydrophobic organic molecules and solid inorganic matter. During the processing of such ores, colloidal particles, such as clay and mineral fines, are released into the aqueous phase often due to the introduction of mechanical shear associated with the hydrocarbon-extraction process. In addition to mechanical shear, alkali water is sometimes added during extraction, creating an environment more suitable for colloidal suspensions. A common method for disposal of the resulting "tailing" solutions, which contain fine colloidal suspensions of clay and minerals, water, sodium hydroxide and small amounts of remaining hydrocarbon, is to store them in "tailings ponds". These ponds take years to settle out the contaminating fines, making the water unsuitable for recycling.

Certain industrial processes that use a large volume of water place strains on the local water supply. For example, in the oil sands extraction industry, flow rate decreases have been observed in the nearby rivers from which processing water is drawn. As a specific example, water demands are a great concern in Athabasca, an oil sand deposit located in northern Alberta Canada, near the Athabasca River. Oil sands from the Athabasca deposit are being mined and processed at a rate of roughly 1,000 kilotonnes per day. The water demand to process this amount of ore adds up to roughly 500 kdam$^3$ per year, accounting for 8% of the province's water usage. With the vast majority of the water ending up in tailings ponds, eventually the surrounding rivers will no longer be able to sustain the industry's water demand. An effective and efficient method of recycling water in this industry is essential for its long-term viability.

In addition, certain industrial processes can create waste streams of large-particle inorganic solids. Using the oil sands example, inorganic solids such as quartz remain after the extraction of hydrocarbon from the oil sands ore. Since the ore that is processed only contains about 8-12% desirable hydrocarbon, a large amount of large-particle inorganic material remains after hydrocarbon extraction. This residue is typically removed in initial separation phases of processing due to its size, insolubility and ease of sequestering. Disposal or storage of this waste material has become a problem for the oil sands industry, again due to the vast volume of many industrial processes. Attempts have been made to use this large coarse solid as a flocculant ballast for the fine colloidal suspension in the tailings ponds; however, aggregation has not been sustainably observed. It would be advantageous to modify this material so that it could be useful in-situ for wastewater treatment purposes.

A typical approach to consolidating fine materials dispersed in water involves the use of coagulants or flocculants. This technology works by linking together the dispersed particles by use of multivalent metal salts (such as calcium salts, aluminum compounds or the like) or high molecular weight polymers such as partially hydrolyzed polyacrylamides. With the use of these agents, there is an overall size increase in the suspended particle mass; moreover, their surface charges are neutralized, so that the particles are destabilized. The overall result is an accelerated sedimentation of the treated particles. Following the treatment, though, a significant amount of water remains trapped with the sedimented particles. These technologies typically do not release enough water from the sedimented material that the material becomes mechanically stable. In addition, the substances used for flocculation/coagulation may not be cost-effective, especially when large volumes of wastewater require treatment, in that they require large volumes of flocculant and/or coagulant. While ballasted flocculation systems have also been described, these systems are inefficient in sufficiently removing many types of fine particles, such as those fine particles that are produced in an oil sands mining.

Particular needs exist in the oil sands industry for removing suspended particles from fluid solutions. Tailings flowing directly from processing oil sands (termed "whole tailings") can contain fine clay particles (termed "clay fines") suspended in an alkaline water solution, along with suspended sand and other particulate matter. The whole tailings can be separated into two fluid streams by processes such as cycloning, where one fluid stream (called the underflow) contains sand, and the other fluid stream (called the overflow) contains the suspended fine clay particles. The overflow from cycloning that contains the fine clay particles is termed fine tailings. Fine tailings can be directed to large man-made tailings ponds to allow the clay particles to settle out gradually via gravity. The settling process can take many years. Tailings ponds typically have four layers, including a bed of settled sand, an overlying thick liquid layer called "mature fine tailings," a liquid layer bearing suspended fines, and a supernatant layer of clarified water. This watery top layer, chilled by exposure to the ambient air temperature, can be reused for oil sands processing, but it must be heated up to the processing temperature of approximately between 50°-80° C. before it can be used.

There remains an overall need in the art, therefore, for a treatment system that removes suspended particles from a fluid solution quickly, cheaply, and with high efficacy. It is also desirable that the treatment system yield a recovered (or recoverable) solid material that retains minimal water, so that it can be readily processed into a substance that is mechanically stable, potentially capable of bearing weight or supporting vehicular traffic, i.e., "trafficable." It is further desirable that the treatment system yield a clarified water that can be readily recycled for further industrial purposes.

As applied to the oil industry, it is desirable that the whole tailings be processed before being directed to the tailings ponds so that the water is separated from the suspended solids. If this separation is performed soon after oil sands processing, the recovered water will still be hot, so that there can be conservation of energy needed to heat the recycled water to the processing temperature. Furthermore, processing the whole tailings to recover water and solids can decrease the amount of waste materials that must be stored in facilities like tailings ponds.

An additional need in the art pertains to the management of existing tailings ponds. In their present form, they are environmental liabilities that may require extensive clean-up efforts in the future. It is desirable to prevent their expansion. It is further desirable to improve their existing state, so that their contents settle more efficiently and completely. A more thorough and rapid separation of solid material from liquid solution in the tailings pond could allow retrieval of recyclable water and compactable waste material, with an overall reduction of the footprint that they occupy.

SUMMARY

Disclosed herein are systems for removing particulate matter from a fluid, comprising a particle functionalized by attachment of at least one amine functional group, wherein the modified particle complexes with the particulate matter within the fluid to form a removable complex therein. In embodiments, the fluid can be a tailing solution. In embodiments, the particulate matter can be quartz or clay fines. In embodiments, the removable complex is more dense than the fluid. In embodiments, the removable complex is less dense than the fluid.

Also disclosed herein are methods for removing particulate matter from a fluid, comprising providing a modified particle comprising a particle functionalized by attachment of at least one amine functional group, dispersing the modified particle within the fluid so that it contacts the particulate matter to form a removable complex in the fluid, and removing the removable complex from the fluid. In embodiments, the fluid can be a tailing solution. In embodiments, the particulate matter can be quartz or clay fines. In embodiments, the removable complex can be removed by filtration. In embodiments, the removable complex can be removed by centrifugation, gravitational settling and/or skimming.

Disclosed herein are embodiments of systems for removing particulate matter from a fluid, comprising an activating material capable of being affixed to the particulate matter to form an activated particle, an anchor particle, and a tethering material capable of being affixed to the anchor particle, wherein the tethering material attaches the anchor particle and the activated particle to form a removable complex in the fluid. In embodiments, the anchor particle can comprise sand. In embodiments, the tethering material can be selected from the group consisting of chitosan, lupamin, BPEI, and PDAC. The activated particle can be a particle functionalized by attachment of at least one amine functional group, as described above.

Disclosed herein are embodiments of methods of removing particulate matter from a fluid, comprising providing an activating material capable of being affixed to the particulate matter, affixing the activating material to the particulate matter to form an activated particle, providing an anchor particle and providing a tethering material capable of being affixed to the anchor particle, and attaching the tethering material to the anchor particle and the activated particle to form a removable complex in the fluid that comprises the particulate matter. Practices of the disclosed methods can comprise removing the removable complex from the fluid. In certain practices, the removable complex can be removed by filtration, centrifugation and/or gravitational settling. In certain practices, the anchor particle can comprise sand. In certain practices, the tethering material can be selected from the group consisting of chitosan, lupamin, BPEI, and PDAC. In certain practices, the particulate matter can comprise quartz and/or clay fines. Disclosed herein are also embodiments of products produced or producible by the aforesaid methods. Further disclosed herein are waste treatment ponds characterized by a beach or pond floor obtained from or obtainable by the aforesaid methods.

DETAILED DESCRIPTION

Disclosed herein are systems and methods for enhancing the settlement rate of dispersed fine materials by incorporating them within a coarser particulate matrix, so that solids can be removed from aqueous suspension as a material having mechanical stability. The systems and methods disclosed herein involve three components: activating the fine particles, tethering them to anchor particles, and sedimenting the fine particle-anchor particle complex.

1. Activation

As used herein, the term "activation" refers to the interaction of an activating material, such as a polymer, with suspended particles in a liquid medium, such as an aqueous solution. In embodiments, high molecular weight polymers can be introduced into the particulate dispersion, so that these polymers interact, or complex, with fine particles. The polymer-particle complexes interact with other similar complexes, or with other particles, and form agglomerates.

This "activation" step can function as a pretreatment to prepare the surface of the fine particles for further interactions in the subsequent phases of the disclosed system and methods. For example, the activation step can prepare the surface of the fine particles to interact with other polymers that have been rationally designed to interact therewith in an optional, subsequent "tethering" step, as described below. Not to be bound by theory, it is believed that when the fine particles are coated by an activating material such as a polymer, these coated materials can adopt some of the surface properties of the polymer or other coating. This altered surface character in itself can be advantageous for sedimentation, consolidation and/or dewatering.

Particles suitable for modification, or activation, can include organic or inorganic particles, or mixtures thereof. Inorganic particles can include one or more materials such as calcium carbonate, dolomite, calcium sulfate, kaolin, talc, titanium dioxide, sand, diatomaceous earth, aluminum hydroxide, silica, other metal oxides and the like. Sand, such as sand recovered from the mining process itself, is preferred. Organic particles can include one or more materials such as starch, modified starch, polymeric spheres (both solid and hollow), and the like. Particle sizes can range from a few nanometers to few hundred microns. In certain embodiments, macroscopic particles in the millimeter range may be suitable.

In embodiments, a particle, such as an amine-modified particle, may comprise materials such as lignocellulosic material, cellulosic material, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants.

Examples of inorganic particles include clays such as attapulgite and bentonite. In embodiments, the inorganic compounds can be vitreous materials, such as ceramic particles, glass, fly ash and the like. The particles may be solid or may be partially or completely hollow. For example, glass or ceramic microspheres may be used as particles. Vitreous materials such as glass or ceramic may also be formed as fibers to be used as particles. Cementitious materials may include gypsum, Portland cement, blast furnace cement, alumina cement, silica cement, and the like. Carbonaceous materials may include carbon black, graphite, carbon fibers, carbon microparticles, and carbon nanoparticles, for example carbon nanotubes.

In embodiments, plastic materials may be used as particles. Both thermoset and thermoplastic resins may be used to form plastic particles. Plastic particles may be shaped as solid bodies, hollow bodies or fibers, or any other suitable shape. Plastic particles can be formed from a variety of polymers. A polymer useful as a plastic particle may be a homopolymer or a copolymer. Copolymers can include block copolymers, graft copolymers, and interpolymers. In embodiments, suitable plastics may include, for example, addition polymers (e.g., polymers of ethylenically unsaturated monomers), polyesters, polyurethanes, aramid resins, acetal resins, formaldehyde resins, and the like. Addition polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of particles may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include, e.g., polyether polyurethanes and polyester polyurethanes. Plastics may also be obtained for these uses from waste plastic, such as post-consumer waste including plastic bags, containers, bottles made of high density polyethylene, polyethylene grocery store bags, and the like.

In embodiments, plastic particles can be formed as expandable polymeric pellets. Such pellets may have any geometry useful for the specific application, whether spherical, cylindrical, ovoid, or irregular. Expandable pellets may be pre-expanded before using them. Pre-expansion can take place by heating the pellets to a temperature above their softening point until they deform and foam to produce a loose composition having a specific density and bulk. After pre-expansion, the particles may be molded into a particular shape and size. For example, they may be heated with steam to cause them to fuse together into a lightweight cellular material with a size and shape conforming to the mold cavity. Expanded pellets may be 2-4 times larger than unexpanded pellets. As examples, expandable polymeric pellets may be formed from polystyrenes and polyolefins. Expandable pellets are available in a variety of unexpanded particle sizes. Pellet sizes, measured along the pellet's longest axis, on a weight average basis, can range from about 0.1 to 6 mm.

In embodiments, the expandable pellets may be formed by polymerizing the pellet material in an aqueous suspension in the presence of one or more expanding agents, or by adding the expanding agent to an aqueous suspension of finely subdivided particles of the material. An expanding agent, also called a "blowing agent," is a gas or liquid that does not dissolve the expandable polymer and which boils below the softening point of the polymer. Blowing agents can include lower alkanes and halogenated lower alkanes, e.g., propane, butane, pentane, cyclopentane, hexane, cyclohexane, dichlorodifluoromethane, and trifluorochloromethane, and the like. Depending on the amount of blowing agent used and the technique for expansion, a range of expansion capabilities exist for any specific unexpanded pellet system. The expansion capability relates to how much a pellet can expand when heated to its expansion temperature. In embodiments, elastomeric materials can be used as particles. Particles of natural or synthetic rubber can be used, for example.

In embodiments, the particle can be substantially larger than the fine particulates it is separating out from the process stream. For example, for the removal of particulate matter with approximate diameters less than 50 microns, particles may be selected for modification having larger dimensions. In other embodiments, the particle can be substantially smaller than the particulate matter it is separating out of the process stream, with a number of such particles interacting in order to complex with the much larger particulate matter. Particles may also be selected for modification that have shapes adapted for easier settling when compared to the target particulate matter: spherical particles, for example, may advantageously be used to remove flake-type particulate matter. In other embodiments, dense particles may be selected for modification, so that they settle rapidly when complexed with the fine particulate matter in the process stream. In yet other embodiments, extremely buoyant particles may be selected for modification, so that they rise to the fluid surface after complexing with the fine particulate matter, allowing the complexes to be removed via a skimming process rather than a settling-out process. In embodiments where the modified particles are used to form a filter, as in a filter cake, the particles selected for modification can be chosen for their low packing density or porosity. Advantageously, particles can be selected that are indigenous to a particular geographical region where the particulate removal process would take place. For example, sand can be used as the particle to be modified for removing particulate matter from the waste stream (tailings) of oil sands mining.

It is envisioned that the complexes formed from the modified particles and the particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

The "activation" step may be performed using flocculants or other polymeric substances. Preferably, the polymers or flocculants can be charged, including anionic or cationic polymers. In embodiments, anionic polymers can be used, including, for example partially hydrolyzed polyacrylamide, polyacrylic acid, polymethacrylic acid, sulfonated polystyrene, and the like. Suitable polycations include: polydiallyldimethylammonium chloride, branched or linear polyethyleneimine, polyvinylamine, and the like. Nonionic polymers suitable for hydrogen bonding interactions can include polyethylene oxide, polypropylene oxide, polyhydroxyethylacrylate, polyhydroxyethylmethacrylate, and the like. Flocculants such as those sold under the trademark MAGNAFLOC® by Ciba Specialty Chemicals can be used.

The activated particle can also be an amine functionalized or modified particle. As used herein, the term "modified particle" can include any particle that has been modified by the attachment of one or more amine functional groups as described herein. The functional group on the surface of the particle can be from modification using a multifunctional coupling agent or a polymer. The multifunctional coupling agent can be an amino silane coupling agent as an example. These molecules can bond to a particle surface (e.g., metal oxide surface) and then present their amine group for interaction with the particulate matter. In the case of a polymer, the polymer on the surface of the particles can be covalently bound to the surface or interact with the surface of the particle and/or fiber using any number of other forces such as electrostatic, hydrophobic, or hydrogen bonding interactions. In the case that the polymer is covalently bound to the surface, a multifunctional coupling agent can be used such as a silane coupling agent. Suitable coupling agents include isocyano silanes and epoxy silanes as examples. A polyamine can then react with an isocyano silane or epoxy silane for example. Polyamines include polyallyl amine, polyvinyl amine, chitosan, and polyethylenimine.

In embodiments, polyamines (polymers containing primary, secondary, tertiary, and/or quartenary amines) can also self-assemble onto the surface of the particles or fibers to functionalize them without the need of a coupling agent. For example, polyamines can self-assemble onto the surface of the particles through electrostatic interactions. They can also be precipitated onto the surface in the case of chitosan for example. Since chitosan is soluble in acidic aqueous conditions, it can be precipitated onto the surface of particles by suspending the particles in a chitosan solution and then raising the solution pH.

In embodiments, the amines or a majority of amines are charged. Some polyamines, such as quartenary amines are fully charged regardless of the pH. Other amines can be charged or uncharged depending on the environment. The polyamines can be charged after addition onto the particles by treating them with an acid solution to protonate the amines. In embodiments, the acid solution can be non-aqueous to prevent the polyamine from going back into solution in the case where it is not covalently attached to the particle.

The polymers and particles can complex via forming one or more ionic bonds, covalent bonds, hydrogen bonding and combinations thereof, for example. Ionic complexing is preferred.

To obtain activated fine materials, the activator could be introduced into a liquid medium through several different means. For example, a large mixing tank could be used to mix an activating material with tailings from oil sands processing bearing fine particulate materials. Alternatively, the activating material can be added along a transport pipeline and mixed, for example, by a static mixer or series of baffles. Activated particles are produced that can be treated with one or more subsequent steps of tethering and anchor-separation.

The particles that can be activated are generally fine particles that are resistant to sedimentation. Examples of particles that can be filtered in accordance with the invention include metals, sand, inorganic, or organic particles. The methods and products of the invention are particularly useful to isolate particles generated from mining operations, such as oil sands processing or other mineral retrieval operations or other bitumen associated solids. The particles are generally fine particles, such as particles having a mass mean diameter of less than 50 microns or particle fraction that remains with the filtrate following a filtration with, for example, a 325 mesh filter. The particles to be removed in the processes described herein are also referred to as "fines."

2. Tethering

As used herein, the term "tethering" refers to an interaction between an activated fine particle and an anchor particle (as described below) so that the activated fine particles become tethered, linked or otherwise attached to the anchor particle. When attached to activated fine particles via tethering, the anchor particles enhance the rate and completeness of sedimentation or removal of the fine particles.

In accordance with these systems and methods, the tethering material acts as a complexing agent to affix the activated particles to an anchor material. In embodiments, sand can be used as an anchor material, as may a number of other substances, as set forth in more detail below. In embodiments, a tethering material can be any type of material that interacts strongly with the activating material and that is connectable to an anchor particle.

As used herein, the term "anchor particle" refers to a particle which facilitates the separation of fine particles. Generally, anchor particles have a density that is greater than the liquid process stream. For example, anchor particles that have a density of greater than 1.3 g/cc can be used. Additionally or alternatively, the density of the anchor particles can be greater than the density of the fine particles or activated particles. Alternatively, the density is less than the dispersal medium, or density of the liquid or aqueous stream. Alternatively, the anchor particles are simply larger than particles. A difference in density or particle size facilitates separating the solids from the medium.

For example, for the removal of particulate matter with an approximate mass mean diameter less than 50 microns, anchor particles may be selected having larger dimensions, e.g., a mass mean diameter of greater than 70 microns. An anchor particle for a given system can have a shape adapted for easier settling when compared to the target particulate matter: spherical particles, for example, may advantageously be used as anchor particles to remove particles with a flake or needle morphology. In other embodiments, increasing the density of the anchor particles may lead to more rapid settlement. Alternatively, less dense anchors may provide a means to float the fine particles, using a process to skim the surface for removal. In this embodiment, one may choose anchor particles having a density of less than about 0.5 g/cc to remove fine particles from an aqueous process stream.

Advantageously, anchor particles can be selected that are indigenous to a particular geographical region where the particulate removal process would take place. For example, sand can be used as the anchor particle for use in removing fine particulate matter from the waste stream (tailings) of oil sands mining.

Suitable anchor particles can be formed from organic or inorganic materials, or any mixture thereof. Anchor particle sizes (as measured as a mass mean diameter) can have a size up to few hundred microns, preferably greater than about 70 microns. In certain embodiments, macroscopic anchor particles up to and greater than about 1 mm may be suitable. Recycled materials or waste, particularly recycled materials and waste having a mechanical strength and durability suitable to produce a product useful in building roads and the like are particularly advantageous.

As an example of a tethering material used with an anchor particle in accordance with these systems and methods, chitosan can be precipitated onto sand particles, for example, via pH-switching behavior. The chitosan can have affinity for anionic systems that have been used to activate fine particles. In one example, partially hydrolyzed polyacrylamide polymers can be used to activate particles, resulting in a particle with anionic charge properties. The cationic charge of the chitosans will attract the anionic charge of the activated particles, to attach the sand particles to the activated fine particles.

In embodiments, various interactions such as electrostatic, hydrogen bonding or hydrophobic behavior can be used to affix an activated particle or particle complex to a tethering material complexed with an anchor particle. In the foregoing example, electrostatic interactions can govern the assembly of the activated fine particle complexes bearing the anionic partially-hydrolyzed polyacrylamide polymer and the cationic sand particles complexed with the chitosan tethering material.

In embodiments, polymers such as linear or branched polyethyleneimine can be used as tethering materials. It would be understood that other anionic or cationic polymers could be used as tethering agents, for example polydiallyldimethylammonium chloride. The efficacy of a tethering material, however, can depend on the activating material. A high affinity between the tethering material and the activating material can lead to a strong and/or rapid interaction there between.

A suitable choice for tether material is one that can remain bound to the anchor surface, but can impart surface properties that are beneficial to a strong complex formation with the activator polymer. For example, a polyanionic activator can be matched with a polycationic tether material or a polycationic activator can be matched with a polyanionic tether material. In hydrogen bonding terms, a hydrogen bond donor should be used in conjunction with a hydrogen bond acceptor. In embodiments, the tether material can be complimentary to the chosen activator, and both materials can possess a strong affinity to their respective deposition surfaces while retaining this surface property.

In other embodiments, cationic-anionic interactions can be arranged between activated fine particles and tether-bearing anchor particles. The activator may be a cationic or an anionic material, as long as it has an affinity for the fine particles to which it attaches. The complementary tethering material can be selected to have affinity for the specific anchor particles being used in the system. In other embodiments, hydrophobic interactions can be employed in the activation-tethering system.

The anchor particle material is preferably added in an amount which permits a flowable slurry. For example, the particle material can be added in an amount greater than 1 gram/liter but less than the amount which results in a non-flowable sludge, amounts between about 1 to about 10 grams/liter, preferably 2 to 6 g/l are often suitable. In some embodiments, it may be desirable to maintain the concentration of the anchor particles to 20 g/l of higher. The anchor particles may be fresh (unused) material, recycled, cleaned ballast, or recycled, uncleaned ballast.

3. Settling

It is envisioned that the complexes formed from the anchor particles and the activated particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

In embodiments, the interactions between the activated fine particles and the tether-bearing anchor particles can enhance the mechanical properties of the complex that they form. For example, an activated fine particle or collection thereof can be durably bound to one or more tether-bearing anchor particles, so that they do not segregate or move from the position that they take on the particles. This property of the complex can make it mechanically more stable.

Increased compatibility of the activated fine materials with a denser (anchor) matrix modified with the appropriate tether polymer can lead to further mechanical stability of the resulting composite material. This becomes quite important when dealing with tailings resulting from mining. This composite material can then be further utilized within the project for road building, dyke construction, or even land reclamation, rather than simply left in a pond to settle at a much slower rate.

A variety of techniques are available for removing the activated-tethered-anchored complexes from the fluid stream. For example, the tether-bearing anchor particles can be mixed into a stream carrying activated fine particles, and the complexes can then be separated via a settling process such as gravity or centrifugation. In another method, the process stream carrying the activated fine particles could flow through a bed or filter cake of the tether-bearing anchor particles. In any of these methods, the modified particles interact with the fine particulates and pull them out of suspension so that later separation removes both modified particles and fine particulates.

As would be appreciated by artisans of ordinary skill, a variety of separation processes could be used to remove the complexes of modified particles and fine particulates. For example, if the anchor particles had magnetic properties, the complexes formed by the interaction of tether-bearing anchor particles and activated fine particulates could be separated using a magnetic field. As another example, if the tether-bearing anchor particles were prepared so that they were electrically conductive, the complexes formed by the interaction of tether-bearing anchor particles and activated fine particulates could be separated using an electric field.

As would be further appreciated by those of ordinary skill, tether-bearing anchor particles could be designed to complex with a specific type of activated particulate matter. The systems and methods disclosed herein could be used for complexing with organic waste particles, for example. Other activation-tethering-anchoring systems may be envisioned for removal of suspended particulate matter in fluid streams, including gaseous streams.

4. Applications a. In-Line Tailings Processing

Extraction of bitumen from oil sands can involve the use of hot water with a caustic agent applied to the mined oil sands ore. During this process, clay particulate matter bound up in the oil sands ore can be exfoliated, producing fine, positively charged clay particles ("fines") that remain suspended in the effluent fluid stream. The effluent fluid stream can be directed to a mechanical separator such as a cyclone that can separate the fluid stream into two components, an overflow fluid comprising fine tails that contains the fine (<approximately 50 micron) clay particles, and an underflow fluid stream that contains coarse tails, mainly sand, with a small amount of fine clay particles.

In embodiments, the systems and methods disclosed herein can treat each fluid stream (including, but not limited to, effluent fluid streams from bitumen extraction methods), an overflow fluid and/or an underflow fluid. An activating agent, such as a polyanion as described above, can preferably be introduced into the overflow fluid stream, resulting in a flocculation of the fine particles therein, often forming a soft, spongy mass. The underflow fluid can be used for the preparation of tether-bearing anchor particles. However, it will be clear that other sources for anchor particles (e.g., sand) can also be used. The sand within the underflow fluid can act as an "anchor particle," as described above. A cationic tethering agent, as described above, can be introduced into the underflow fluid so that it self-assembles onto the surface of the anchor particles, creating a plurality of tether-bearing anchor particles.

Following this treatment to each fluid stream, the two fluid streams can be re-mixed in a batch, semi-batch or continuous fashion. The tether-bearing anchor particles can interact, preferably electrostatically, with the activated, preferably flocculating, fine clay particles, forming large agglomerations of solid material that can be readily removed from or settled in the resulting fluid mixture.

In embodiments, the aforesaid systems and methods are amenable to incorporation within existing tailings separation systems. For example, a treatment process can be added in-line to each of the separate flows from the overflow and underflow fluids; treated fluids then re-converge to form a single fluid path from which the resulting agglomerations can be removed. Removal of the agglomerations can take place, for example, by filtration, centrifugation, or other type of mechanical separation.

In one embodiment, the fluid path containing the agglomerated solids can be subsequently treated by a conveyor belt system, analogous to those systems used in the papermaking industry. In an exemplary conveyor belt system, the mixture of fluids and agglomerated solids resulting from the electrostatic interactions described above can enter the system via a headbox. A moving belt containing a mechanical separator can move through the headbox, or the contents of the headbox are dispensed onto the moving belt, so that the wet agglomerates are dispersed along the moving belt. One type of mechanical separator can be a filter with a pore size smaller than the average size of the agglomerated particles. The size of the agglomerated particles can vary, depending upon the size of the constituent anchor particles (i.e., sand). For example, for systems where the sand component has a size between 50/70 mesh, an 80 mesh filter can be used. Other adaptations can be envisioned by artisans having ordinary skill in the art. Agglomerated particles can be transported on the moving belt and further dewatered. Water removed from the agglomerated particles and residual water from the headbox from which agglomerates have been removed can be collected in whole or in part within the system and optionally recycled for use in subsequent oil sands processing.

In embodiments, the filtration mechanism can be an integral part of the moving belt. In such embodiments, the captured agglomerates can be physically removed from the moving belt so that the filter can be cleaned and regenerated for further activity. In other embodiments, the filtration mechanism can be removable from the moving belt. In such embodiments, the spent filter can be removed from the belt and a new filter can be applied. In such embodiments, the spent filter can optionally serve as a container for the agglomerated particles that have been removed.

Advantageously, as the agglomerated particles are arrayed along the moving belt, they can be dewatered and/or dried. These processes can be performed, for example, using heat, air currents, or vacuums. Agglomerates that have been dewatered and dried can be formed as solid masses, suitable for landfill, construction purposes, or the like.

Desirably, the in-line tailings processing described above is optimized to capitalize upon the robustness and efficiency of the electrostatic interaction between the activated tailings and the tether-bearing anchor particles. Advantageously, the water is quickly removed from the fresh tailings during the in-line tailings processing, to minimize heat losses. Recycling this hot water saves energy: water that is already hot does not require as much heating to get it to an operational processing temperature, while recycling cold water, such as would be found in tailings ponds, requires a substantial amount of heating and resultant energy use.

b. Treatment Ponds

The systems and methods disclosed herein can be used for treatment of tailings at a facility remote from the oil sands production facility or in a pond. Similar principles are involved: the fluid stream bearing the fine tailings can be treated with an anionic activating agent, preferably initiating flocculation. A tether-bearing anchor particle system can then be introduced into the activated tailings stream, or the activated tailings stream can be introduced into a tether-bearing anchor particle system. In embodiments, a tailings stream containing fines can be treated with an activating agent, as described above, and applied to a stationary or moving bed of tether-bearing anchor particles. For example, a stationary bed of tether-bearing anchor particles can be arranged as a flat bed over which the activated tailings stream is poured. The tether-bearing anchor particles can be within a container or housing, so that they can act as a filter to trap the activated tailings passing through it. On a larger scale, the tether-bearing anchor particles can be disposed on a large surface, such as a flat or inclined surface (e.g., a beach), so that the activated tailings can flow over and through it, e.g. directionally toward a pond.

As an example, sand particles retrieved from the underflow fluid stream can be used as the anchor particles to which a cationic tether is attached. A mass of these tether-bearing anchor particles can be arranged to create a surface of a desired thickness, forming an "artificial beach" to which or across which the activated tailings can be applied. As would be appreciated by those of ordinary skill in the art, the application of the activated tailings to the tether-bearing anchor particles can be performed by spraying, pouring, pumping, layering, flowing, or otherwise bringing the fluid bearing the activated tailings into contact with the tether-bearing anchor particles. The activated tailings are then associated with the tether-bearing anchor particles while the remainder of the fluid flows across the surface and into a collection pond or container.

c. Tailings Pond Remediation

In embodiments, an adaptation of the activator-tether-anchor systems disclosed herein can be applied to the remediation of existing tailings ponds. Tailings ponds comprise four layers of materials, reflecting the gravity-induced settlement of fresh tailings after long residence periods in the pond. The top layer in the tailings pond comprises clarified water. The next layer is a fluid suspension of fine clay particles like fine tailings. The third layer, called "mature fine tailings (MFTs)," is a stable suspension of fluid fine tailings that has undergone self-weight consolidation/ dewatering to a density of about 30 to 45 wt % solids content over a period of about 2 or 3 years after deposition and that lacks sufficient strength to form a trafficable surface. The rate of consolidation for MFTs is substantially reduced after the initial self-weight consolidation period, and the suspension acts like a viscous fluid containing suspended fine clay particles that have not yet settled out. The bottom layer is formed predominately from sand that has settled by gravity.

Desirably, the mature fine tailings (MFTs) can be treated to separate the water that they contain from the fine clay particles suspended therein. If the MFTs can be treated, the resultant clarified water can be drawn off and the solid material can be reclaimed. This could reduce the overall size of the tailings ponds, or prevent them from growing larger as fresh untreated tailings are added.

In embodiments, the systems and methods disclosed herein can be adapted to treat MFTs, such as are contained in tailings ponds. These systems and methods thus present an opportunity for treating the tailings ponds overall. In an embodiment, an activating agent, for example, one of the anionic polymers disclosed herein can be added to a pond, or MFT layer within a tailings pond, such as by injection with optional stirring or agitation. Tether-bearing anchor particles can then be added to the pond or layer containing the activated MFTs. For example, the tether-bearing anchor particles can be added to the pond from above, so that they descend through the activated MFT layer. As the activated MFT layer is exposed to the tether-bearing anchor particles, the flocculated fines can adhere to the anchor particles and be pulled down to the bottom of the pond by gravity, leaving behind clarified water. The tailings pond can thus be separated into two components, a top layer of clarified water, and a bottom layer of congealed solid material. The top layer of clarified water can then be recycled for use, for example in further oil sands processing. The bottom layer of solids can be retrieved, dewatered and used for construction purposes, landfill, and the like.

d. Treating Waste or Process Streams with Amine Modified Particles

Particles modified in accordance with these systems and methods may be added to fluid streams to complex with the particulate matter suspended therein so that the complex can be removed from the fluid. In embodiments, the modified particles and the particulate matter may interact through electrostatic, hydrophobic, covalent or any other type of interaction whereby the modified particles and the particulate matter form complexes that are able to be separated from the fluid stream. The modified particles can be introduced to the process or waste stream using a variety of techniques so that they complex with the particulate matter to form a removable complex. A variety of techniques are also available for removing the complexes from the fluid stream. For example, the modified particles can be mixed into the stream and then separated via a settling process such as gravity or centrifugation. If buoyant or low-density modified particles are used, they can be mixed with the stream and then separated by skimming them off the surface. In another method, the process stream could flow through a bed or filter cake of the modified particles. In any of these methods, the modified particles interact with the fine particulates and pull them out of suspension so that later separation removes both modified particles and fine particulates.

As would be appreciated by artisans of ordinary skill, a variety of separation processes could be used to remove the complexes of modified particles and fine particulates. For example, if the modified particles were modified so as to be magnetic, the complexes of modified particles and fine particulates could be separated using a magnetic field. As another example, of the modified particles were modified so as to be electrically conductive, the complexes of modified particles and fine particulates could be separated using an electric field.

EXAMPLES

Materials:
The following chemicals were used in the Examples below:
Washed Sea Sand, 50+70 Mesh
Sigma Aldrich
St. Louis, Mo.
Chitosan CG 800
Primex
Siglufjodur, Iceland
Branched Polyethyleneimine (BPEI) (50% w/v)
Sigma Aldrich
St. Louis, Mo.
Polyvinyl Amine—Lupamin 1595, Lupamin 9095
BASF
Ludwigshafen, Germany
Poly(diallyldimethylammonium chloride) (pDAC) (20% w/v)
Sigma Aldrich
St. Louis, Mo.
FD&C Blue #1
Sigma Aldrich
St. Louis, Mo.
Hydrochloric Acid
Sigma Aldrich
St. Louis, Mo.
Tailings Solution from a low-grade tar sand
Dicalite, Diatomaceous Earth
Grefco Minerals, Inc.
Burney, Calif.
3-Isocyanatopropyltriethoxysilane
Gelest
Morrisville, Pa.
Sodium Hydroxide
Sigma Aldrich
St. Louis, Mo.
Isopropyl Alcohol (IPA)
Sigma Aldrich
St. Louis, Mo.

Example 1: BPEI Coated Diatomaceous Earth

Diatomaceous earth (DE) particles coupled with BPEI are created using a silane coupling agent. 100 g of DE along with 1000 mL isopropyl alcohol (IPA) and a magnetic stir bar is placed into an Erlenmeyer flask. 1 gm 3-Isocyanatopropyltriethoxysilane is added to this solution and allowed to react for 2 hours. After 2 hours, 2 mL of BPEI is added and stirred for an additional 5 hours before filtering and washing the particles with IPA 2×'s and deionized water (DI water). The particles are then filtered and washed with a 0.12 M HCl solution in isopropanol (IPA) then dried.

Example 2: 1% Chitosan CG800 Stock Solution

The chitosan stock solution is created by dispersing 10 g of chitosan (flakes) in 1000 mL of deionized water. To this solution is added hydrochloric acid until a final pH of 5 is achieved by slowly and incrementally adding 12 M HCl while continuously monitoring the pH. This solution becomes a stock solution for chitosan deposition.

Example 3: Diatomaceous Earth—1% Chitosan Coating 10 g of diatomaceous earth is added to 100 mL deionized water with a stir bar to create a 10% slurry. To this slurry is added 10 mL's of the 1% chitosan stock solution of CG800. The slurry is allowed to stir for 1 hour. Once the slurry becomes homogeneous the polymer is precipitated out of solution by the slow addition of 0.1 N sodium hydroxide until the pH stabilizes above 7 and the chitosan precipitates onto the particles of diatomaceous earth. The slurry is filtered and washed with a 0.05 M HCl solution in isopropanol (IPA) then dried.

Example 4: Particle Performance on Tailings Solution

Coated and uncoated diatomaceous earth particles were used in experiments to test their ability to settle dispersed clay fines in an aqueous solution. The following procedure was used for each type of particle, and a control experiment was also performed where the particle addition step was omitted.

One gram of particles was added to a centrifugation tube. Using a syringe, the centrifugation tube was then filled with 45 ml of tailing solution containing dispersed clay. One more tube was filled with just the tailings solution and no diatomaceous earth particles. The tube was manually shaken for 30 seconds and than placed on a flat countertop. The tube was then observed for ten minutes allowing the clay fines to settle out.

Results:

No DE addition (control samples): Tailing solution showed no significant improvement in cloudiness.

DE Coated with Chitosan: Tailing solution was significantly less cloudy compared to control samples.

DE Coated with BPEI: Tailing solution was significantly less cloudy compared to control samples.

DE Uncoated: Tailing solution showed no significant improvement in cloudiness compared to control samples.

Example 5: Preparation of Polycation-Coated Washed Sea Sand

Washed sea sand is coated with each of the following polycations: chitosan, lupamin, BPEI, and PDAC. To perform the coating, an aqueous solution was made of the candidate polycation at 0.01M concentration, based on its molecular weight. 50 g washed sea sand was then placed in a 250 ml jar, to which was added 100 ml of the candidate polycation solution. The jar was then sealed and rolled for three hours. After this, the sand was isolated from the solution via vacuum filtration, and the sand was washed to remove excess polymer. The coated sea sand was then measured for cation content by solution depletion of an anionic dye (FD&C Blue #1) which confirmed deposition and cationic nature of the polymeric coating. The sea sand coated with the candidate polymer was then used as a tether-attached anchor particle in interaction with fine particulate matter that was activated by treating it with an activating agent.

Example 6: Use of Polymer-coated Sea Sand to Remove Fine Particles From Solution In this Example, a 45 ml dispersion of fine materials (7% solids) from an oil sands tailings stream is treated with an activating polymer (Magnafloc LT30, 70 ppm). The fines were mixed thoroughly with the activating polymer. 10 gm of sea sand that had been coated with PDAC according to the methods of Example 1 were added to the solution containing the activated fines. This mixture is agitated and is immediately poured through a stainless steel filter, size 70 mesh. After a brief period of dewatering, a mechanically stable solid is retrieved. The filtrate is also analyzed for total solids, and is found to have a total solids content of less than 1%.

Control Example: Use of Sea Sand without Polymer Coating to Remove Fine Particles from Solution In this Example, a 45 ml dispersion of fine materials (7% solids) is treated with an activating polymer (Magnafloc LT30, 70 ppm). The fines were mixed thoroughly with the activating polymer. 10 gm of uncoated sea sand were added to the solution containing the activated fines. This mixture is agitated and is immediately poured through a stainless steel filter, size 70 mesh. The filtrate is analyzed for total solids, and is found to have a total solids content of 2.6%.

EQUIVALENTS

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

What is claimed:

1. A method of removing particulate matter from a tailings pond fluid, wherein the tailings pond fluid comprises a suspension of the particulate matter, the method comprising:
    providing a charged polymeric activating material capable of being affixed to the particulate matter in the suspension;
    adding the charged polymeric activating material to the particulate matter in the suspension to form suspended activated particulate matter;
    attaching a charged polymeric tethering material to anchor Particles to form tether-bearing anchor particles;
    adding the tether-bearing anchor particles to the suspended activated particulate matter, whereby the tether-bearing anchor particles adhere to the suspended activated particulate matter to form removable complexes in the tailings pond fluid that comprise the particulate matter; and
    separating the removable complexes from the suspension;
    wherein when the charged polymeric activating material is an anionic polymer, the charged polymeric tethering material is a cationic polymer, and when the charged polymeric activating material is a cationic polymer, the charged polymeric tethering material is an anionic polymer.

2. The method of claim 1, wherein the removable complexes are removed by gravitational settling, whereby the removable complexes are pulled to the bottom of the tailings pond.

3. The method of claim 1, wherein the anchor particles comprise sand.

4. The method of claim 1, wherein the particulate matter comprises quartz and/or clay fines.

5. The method of claim 1, wherein the particulate matter is suspended in a mature fine tailings layer within the tailings pond fluid.

6. The method of claim 5, wherein the step of adding the charged polymeric activating material to the particulate matter comprises injecting the charged polymeric activating material into the mature fine tailings layer.

7. The method of claim 6, further comprising stirring or agitating the suspension after injecting the charged polymeric activating material into the mature fine tailings layer.

8. The method of claim 5, wherein the tether-bearing anchor particles descend through the mature fine tailings layer, whereby the suspended activated particulate matter adheres to the tether-bearing anchor particles.

9. The method of claim 1, wherein the anchor particles have a diameter greater than the diameter of the particulate matter.

10. The method of claim 9, wherein, when the particulate matter has an approximate mass mean diameter less than 50 microns, the approximate mass mean diameter of the anchor particles is greater than 70 microns.

11. The method of claim 1, wherein the anchor particles have a density greater than the density of the suspended activated particulate matter.

12. The method of claim 11, wherein the anchor particles have a density greater than 1.3 gm/cc.

13. The method of claim 1, wherein the step of separating the removable complexes from the suspension separates the tailings pond into a top layer of clarified water and a bottom layer of congealed solid material.

14. The method of claim 13, further comprising retrieving the bottom layer of congealed solid material from the tailings pond after the separating the removable complexes from the suspension.

15. The method of claim 13, further comprising recycling the top layer of clarified water following the separating the removable complexes from the suspension.

* * * * *